United States Patent

Giovannetti

[11] Patent Number: 5,815,648
[45] Date of Patent: Sep. 29, 1998

[54] APPARATUS AND METHOD FOR CHANGING THE CACHE MODE DYNAMICALLY IN A STORAGE ARRAY SYSTEM

[75] Inventor: Federico Antonio Giovannetti, Ocean, N.J.

[73] Assignee: ECCS, Inc., Tinton Falls, N.J.

[21] Appl. No.: 557,613

[22] Filed: Nov. 14, 1995

[51] Int. Cl.$^6$ .................................................. G06F 11/00
[52] U.S. Cl. ...................................................... 395/182.03
[58] Field of Search .............................. 395/182.03, 461, 395/469, 470, 471, 472, 481; 711/133, 134, 142, 143, 144, 145

[56] References Cited

U.S. PATENT DOCUMENTS

| | | | |
|---|---|---|---|
| 4,851,990 | 7/1989 | Johnson et al. | 364/200 |
| 5,025,366 | 6/1991 | Baror | 364/200 |
| 5,091,846 | 2/1992 | Sachs et al. | 395/250 |
| 5,140,592 | 8/1992 | Idleman et al. | 371/8.1 |
| 5,142,627 | 8/1992 | Elliot et al. | 395/275 |
| 5,155,843 | 10/1992 | Stamm et al. | 395/575 |
| 5,347,648 | 9/1994 | Stamm et al. | 395/575 |
| 5,381,544 | 1/1995 | Okazawa et al. | 395/575 |
| 5,524,212 | 6/1996 | Somani et al. | 395/200.08 |
| 5,524,234 | 6/1996 | Martinez, Jr. et al. | 395/468 |
| 5,553,263 | 9/1996 | Kausch et al. | 395/454 |
| 5,636,359 | 6/1997 | Beardsley et al. | 395/449 |
| 5,649,153 | 7/1997 | McNutt et al. | 395/445 |
| 5,652,915 | 7/1997 | Jeter et al. | 395/872 |

*Primary Examiner*—Robert W. Beausoliel, Jr.
*Assistant Examiner*—Stephen C. Elmore
*Attorney, Agent, or Firm*—Thomason & Moser

[57] ABSTRACT

A method for changing the cache mode of a volume in response to user commands or detection of a failure within the storage system. Specifically, the method applies the new cache mode to all newly issued I/O requests, while retaining the old cache mode for previously unfinished or queued I/O requests. The method incorporates a cache mode field to the I/O request data structure. The cache mode field specifies the cache mode to be used for that I/O request. The method initializes the I/O request cache mode field with the value of the cache mode field of the corresponding target volume. When the cache mode of a volume is changed, all subsequent I/O requests to the volume are tagged with the new cache mode in their cache mode field. However, previous I/0 requests will retain the former cache mode and will be completed using the former cache mode.

13 Claims, 3 Drawing Sheets

APPARATUS AND METHOD FOR CHANGING THE CACHE MODE DYNAMICALLY IN A STORAGE ARRAY SYSTEM

The present invention relates to an apparatus and method for changing the cache mode of a volume dynamically without causing inconsistency. More particularly, this invention relates to an apparatus and method that alters the cache mode for newly issued I/O requests, while retaining the old cache mode of previously "unfinished" or queued I/O requests.

BACKGROUND OF THE INVENTION

The astounding improvement in processing power of computer systems presents an ever increasing problem for Input/Output (I/O) devices. Generally, improvements in I/O performance have not kept pace with those of computers. Specifically, data access to and from a storage device such as a disk, often limits the performance of a computer system.

To improve performance, I/O systems may incorporate disk arrays such as a redundant array of independent disks, commonly known as RAID or RAID array, to accelerate I/O operations and to provide data redundancy. A disk array is a collection of disks from one or more commonly accessible disk subsystems controlled by array management software. A disk subsystem may include a collection of disks and the necessary hardware (such as a controller and I/O adapters) to connect the disks to one or more host computer systems.

The array management software controls the operation of the disks and presents them as one or more volumes (virtual disks) to a host computer system (or its operating system). In essence, the array management software presents the storage to the host computer system as one or more volumes by transparently converting I/O operations directed at volumes to I/O operations on the underlying member disks.

Furthermore, various disk arrays exist with different cost, availability and I/O performance. Two common disk arrays are "mirrored array" and "striped array". Mirrored arrays contains two or more member disks which contain identical set of user data for improving reliability. In contrast, striped arrays generally interleave user data on two or more member disks for improving the speed of read and write operations. Currently, many different disk array configurations exist, e.g., RAID levels 0–6 and various other hybrid RAID levels which incorporate some aspects in part or in combination of the mirrored and striped array configurations. Thus, the use of disk arrays permits parallel processing of I/O operations, thereby improving I/O performance.

To further improve I/O performance, caching can be incorporated with disk arrays to reduce disk I/O operations. Cache memory usually consists of volatile semiconductor random access memory which is used to store recently accessed user data. The concept of caching is well known in the art. If data is needed to satisfy an I/O request, a search is initially conducted in the cache memory prior to searching the primary storage devices such as disk arrays. Since the access speed of volatile memory is significantly greater than that of a disk array, accessing data to and from a cache memory (a cache hit) for satisfying an I/O request, instead of the disk array (a cache miss), will significantly improve I/O performance.

Nevertheless, update of the data within the disk array is required at some point for maintaining consistency of the user data between the cache memory and the disk array. The cache "update policy" (cache mode) used to write modified data back to the disk array affects the system's performance and reliability. Two common cache modes are "write-through" and "delayed-write" (also known as write-back or write-behind).

Write-through updates the disk array as soon as data are placed on the cache memory. Since the disk array is always updated when the cache is written to by the host computer, this cache mode provides high reliability at the expense of performance. This mode generally requires each write access to wait until the data is written to the disk array.

In contrast, delayed-write postpones the updates to the disk array when modifications are written to the cache memory. This cache mode permits write access to complete more quickly. Furthermore, data may be overwritten repeatedly in cache memory before they are updated in the disk array, so that only the last update is written to the disk array. Unfortunately, the delayed-write mode introduces reliability problems, since unwritten data are lost whenever a user machine crashes.

Thus, the selection of a cache mode must be balanced between the need for reliability and I/O performance. Although the cache mode can be changed globally during operation, consistency problems may develop. Since the delayed-write mode defers updates to the disk arrays, the array management software must track the data in the cache memory that needs to be written to the disk arrays if the cache mode is changed from delayed-write to write-through.

Additionally, when striped arrays are used, an I/O request is often passed between multiple member disks since user data is distributed on two or more member disks. This creates the additional problem of changing the cache mode while an I/O request is waiting for service within the queue of one or more individual member disks. Inconsistency may arise if an I/O request is processed with different cache modes as it travels between member disks of a volume.

One solution to avoid these inconsistencies is to halt I/O operations until all queued I/O requests are completed and to "flush" the cache memory so that the data in the cache is consistent with the data in the disk arrays. Although this method ensures consistency, it also incurs a heavy performance penalty.

Therefore, a need exists in the art for an apparatus and method that alters the cache mode without halting I/O operations or risking data inconsistency.

SUMMARY OF THE INVENTION

The present invention is a method for changing the cache mode of a volume in response to user commands or detection of a failure within the storage system. Namely, the method alters the cache mode of a volume instantaneously (on the fly) in response to reliability or performance requirements.

Specifically, the method applies the new cache mode to all newly issued I/O requests, while retaining the old cache mode for previously unfinished or queued I/O requests. The method incorporates a cache mode field to the I/O request data structure. The cache mode field specifies the cache mode to be used for that I/O request. The method initializes the I/O request cache mode field with the value of the cache mode field of the corresponding target volume. When the cache mode of a volume is changed, all subsequent newly issued I/O requests to the volume are tagged with the new cache mode in their cache mode field. However, unfinished I/O requests will retain the former cache mode and will be completed using the former cache mode. Thus, the method alters the cache mode of the volume without creating inconsistency of the user data or halting I/O operations.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
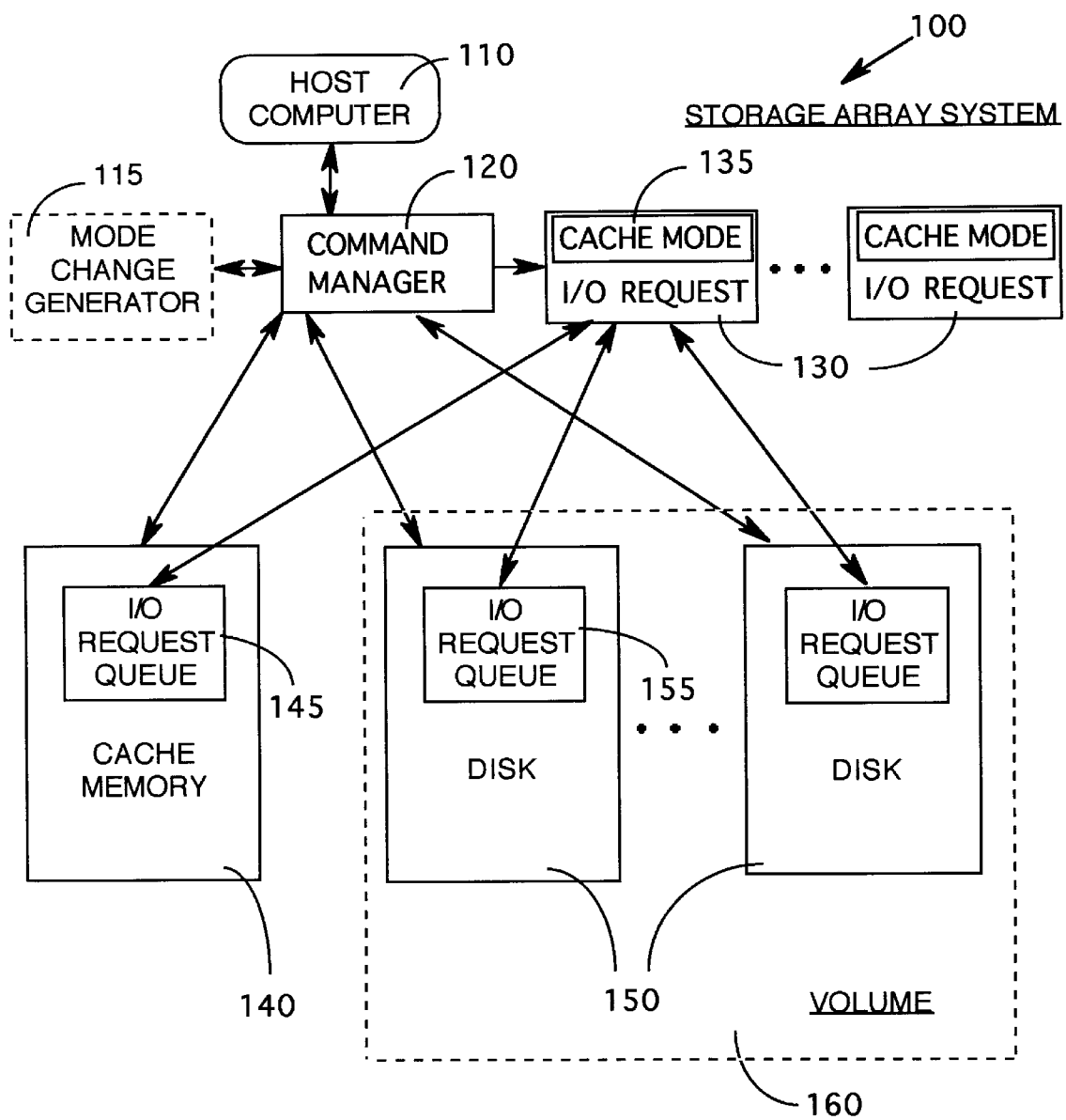
FIG. 1 illustrates a block diagram of a storage array system incorporating cache memory of the present invention.

FIG. 1 depicts a storage array system 100 comprising a host computer 110, a command manager 120, a cache memory 140 and a volume 160 having a plurality of storage elements or disks 150. Host computer 110 includes any computer system (mainframes, servers, workstations and personal computers) to which disks are directly attached and accessible for performing I/O operations. The host computer may execute a plurality of software programs (applications) on one or more processors. The applications will periodically access the storage elements to perform read and/or write operations. However, the applications generally do not access the storage elements directly, but instead, simply issue a plurality of I/Os to a high level interface such as a command manager 120.

The command manager 120 serves as an interface between the host computer and the various storage devices, thereby relieving the host computer from having to perform I/O operations. Those skilled in the art will realize that the command manager can be implemented as part of the operating system or as a separate interface application. The command manager 120 converts the I/Os into a plurality of I/O requests 130. Each I/O request contains the necessary information for performing an I/O operation. The information stored within the I/O request includes operation instructions and the location of the data such as disk location, block location, block size and location for storing retrieved data. In the preferred embodiment, the I/O request 130 includes a cache mode field 135. The data structure of the I/O request 130 and its implementation is discussed below with reference to FIG. 3 and FIG. 4.

Generally, I/O requests are passed to individual storage device for processing. The storage devices may possess individually or collectively a controller (not shown) for handling the I/O requests. The controller executes the I/O operation and returns the result to the command manager which, in turn, notifies the host computer of the completed I/O operation. However, if the I/O request requires additional processing, e.g., the user data is located on multiple storage devices, then the command manager will forward the I/O request to the next storage device to complete the I/0 operation.

In the preferred embodiment, the I/O request 130 is initially passed to the cache memory 140 for processing. The cache memory incorporates a queue 145 for storing a plurality of I/O requests which are waiting for the cache memory for service. Those skilled in the art will realize that the queue can be implemented as part of the cache memory or as a separate unit outside of the cache memory. The cache memory determines whether the I/O request can be serviced by the cache memory. If the I/O request is a read operation and the data is present, the cache memory performs the read operation and returns the result to the command manager. The command manager, in turn, notifies the host computer of the completed I/O operation.

If the I/O request is a write operation, the cache memory performs the write operation and returns the result to the command manager. If the cache mode for the I/O request is set for delayed-write, then the command manager notifies the host computer of the completed I/O operation and schedules a future write operation. Each volume incorporates a plurality of member disks 150 with each having a separate queue 155 for storing a plurality of I/O requests which are waiting for the disk for service. Alternatively, the volume 160 may incorporate a common queue which is shared by the disk members 150 as illustrated in FIG. 2.

However, if the cache mode for the I/O request is set for write-through, then the command manager 120 passes the I/O request directly to the relevant volumes 160 to update the data in the disk arrays. The command manager will only notify the host computer of the completed I/O operation after the data have been written to all the relevant disks within a volume. In this fashion, the write-through mode ensures reliability at the expense of performance, since the host computer will not be notified of the completed I/O operation until write operations to both the cache and the disk arrays are completed.

Finally, storage array system 100 may comprise an optional mode change generator 115. This mode change generator produces cache mode change commands in response to detection of one or more hardware failures within the storage array system. Thus, the mode change generator is coupled to a plurality of sensors (not shown) for detecting one or more hardware failures including, but not limited to a power supply failure, a disk failure, a controller failure, a fan failure or a rise in temperature beyond the normal operating temperature of the storage system. When such a failure occurs, the mode change generator 115 detects the failure and causes the command manger 120 to change the cache mode of the affected volumes. Those skilled in the art will realize that the mode change generator can be implemented as part of the command manager or as a separate detection application or device.

Figure 2:
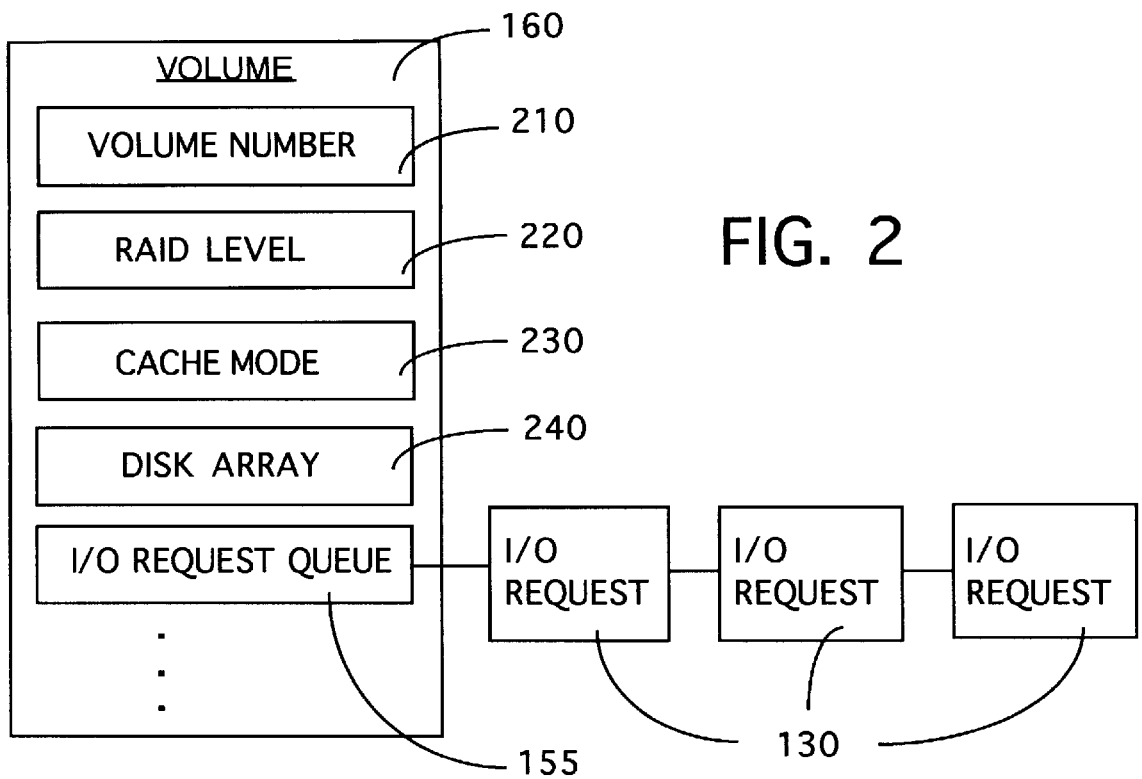
FIG. 2 illustrates a block diagram of a volume data structure of the present invention.

FIG. 2 illustrates a block diagram of the data structure used to represent the volume 160. The data structure comprises a volume number 210, a RAID level 220, a cache mode 230, disk array 240 and I/O request queue 155. Each volume within the storage array system is provided with a volume number for identification. Although FIG. 1 depicts a single volume, the storage array system 100 may incorporate up to "n" number of volumes.

The RAID level field indicates the RAID operating level for the current volume. RAID arrays come in various operating levels which range from RAID level 0 to RAID level 6. Currently, there are additionally hybrid RAID levels which are combinations of the various RAID levels. The RAID levels are different disk array models that provide different cost, reliability and performance. For example, RAID level 1 provides excellent reliability by mirroring disk arrays, although RAID level 1 is burdened with the high cost of providing duplicate disks. In contrast, RAID 3 provides moderate reliability through of the use of a dedicated parity disk and is only burdened with the cost of providing one additional dedicated parity disk. The proper selection of a RAID level for the volume depends upon the specific application of the storage array system. Thus, the RAID level field indicates the RAID level selected for the current volume.

Each volume 160 has a cache mode field 230 which specifies the current cache mode of operation for that particular volume. The cache mode field indicates the update policy for the current volume after data is written to the cache. The possible values are: 1) no cache, 2) write-through and 3) delayed-write. The no cache value indicates that the cache memory is not present and the I/O requests are directly passed to the volume from the command manager as shown in FIG. 1. When the command manager 120 generates an I/O request, it acquires the cache mode for the I/O request from the volume cache mode field 230 of the target volume. Thus, when the cache mode of a volume is changed, the cache mode field of that volume is immediately updated to reflect the new value. In turn, all subsequent I/O requests to the volume will have their cache mode field tagged with the new cache mode. Previous I/O requests will retain the former cache mode and will be completed using the former mode of operation. This method provides the advantage of altering the cache mode of a volume without creating inconsistency of the user data or halting I/O operations until all requests having the previous cache mode are processed.

FIG. 2 also depicts a disk array 240 within volume 160. As discussed above, disk array 240 typically incorporates a plurality of member disks 150 which are configured in accordance with the RAID level field 220. Finally, the volume incorporates an I/O request queue 155 for storing a plurality of I/O requests 130. However, the single I/O request queue can be implemented as separate queues with each queue assigned to a separate disk as shown in FIG. 1. Furthermore, those skilled in the art will realize that the volume data structure is not limited to these fields and additional fields can be incorporated within the volume data structure.

Figure 3:
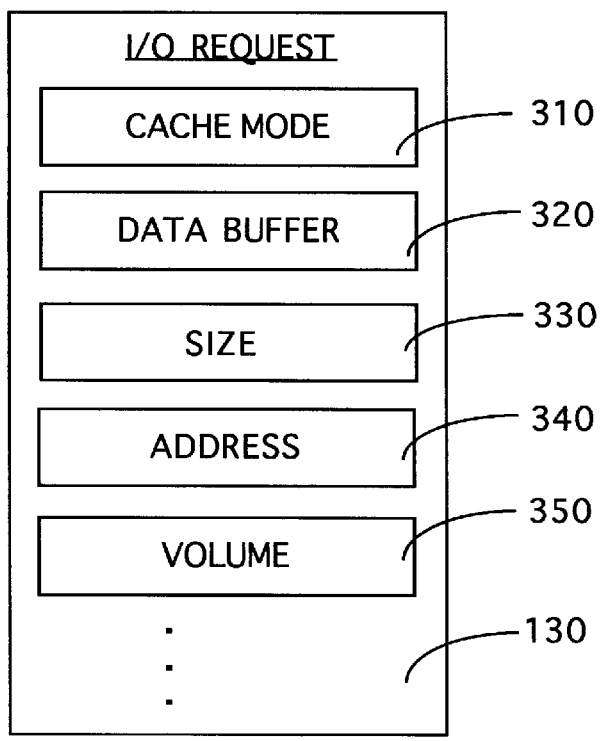
FIG. 3 illustrates a block diagram of an I/O request data structure of the present invention.

FIG. 3 illustrates a block diagram of the data structure used to represent an I/O request 130. The data structure comprises a cache mode field 310, a data buffer field 320, a size field 330, an address field 340 and a volume field 350.

The cache mode field specifies the cache mode to be used for that I/O request. The I/O request cache mode field 310 is initialized or tagged with the value of the cache mode field 230 of the corresponding target volume 160. Since the I/O request is tagged with a specific cache mode, this method permits the I/O request to be processed with the same cache mode as it travels from disk to disk. Without this tag, the I/O request will be processed with different modes if the volume cache mode is changed before the I/O request is completely processed. This creates a potential problem of inconsistency between the data in the cache memory and the data in the disk array.

To illustrate, if the cache mode of a volume is set with delayed-write, then the I/O request is typically scheduled for a later flush after the write operation is completed at the cache memory. If the cache mode of the volume is subsequently changed to write-through prior to the complete processing of the I/O request, then there is the possibility that the flush operation will not be carried out. The same problem may result if the I/O request is not fully completed as it travels from disk to disk within the volume. Since the delayed-write operations to the disk array are not performed for the queued or unfinished I/O requests, inconsistency between the data in the cache memory and the disk array will develop. Thus, the cache mode field in the I/O request permits the cache mode of the volume to be altered without creating inconsistency of the user data or halting I/O operations.

The data buffer field 320 generally carries the data that are written to the disk array. The size field 330 and address field 340 contains information relating to the size of the data and location on the disk where the data should be written. Finally, the volume field 350 identifies the target volume that the I/O request is destined for. However, those skilled in the art will realize that the I/O request data structure is not limited to these fields and additional fields can be incorporated within the I/O request data structure.

Figure 4:
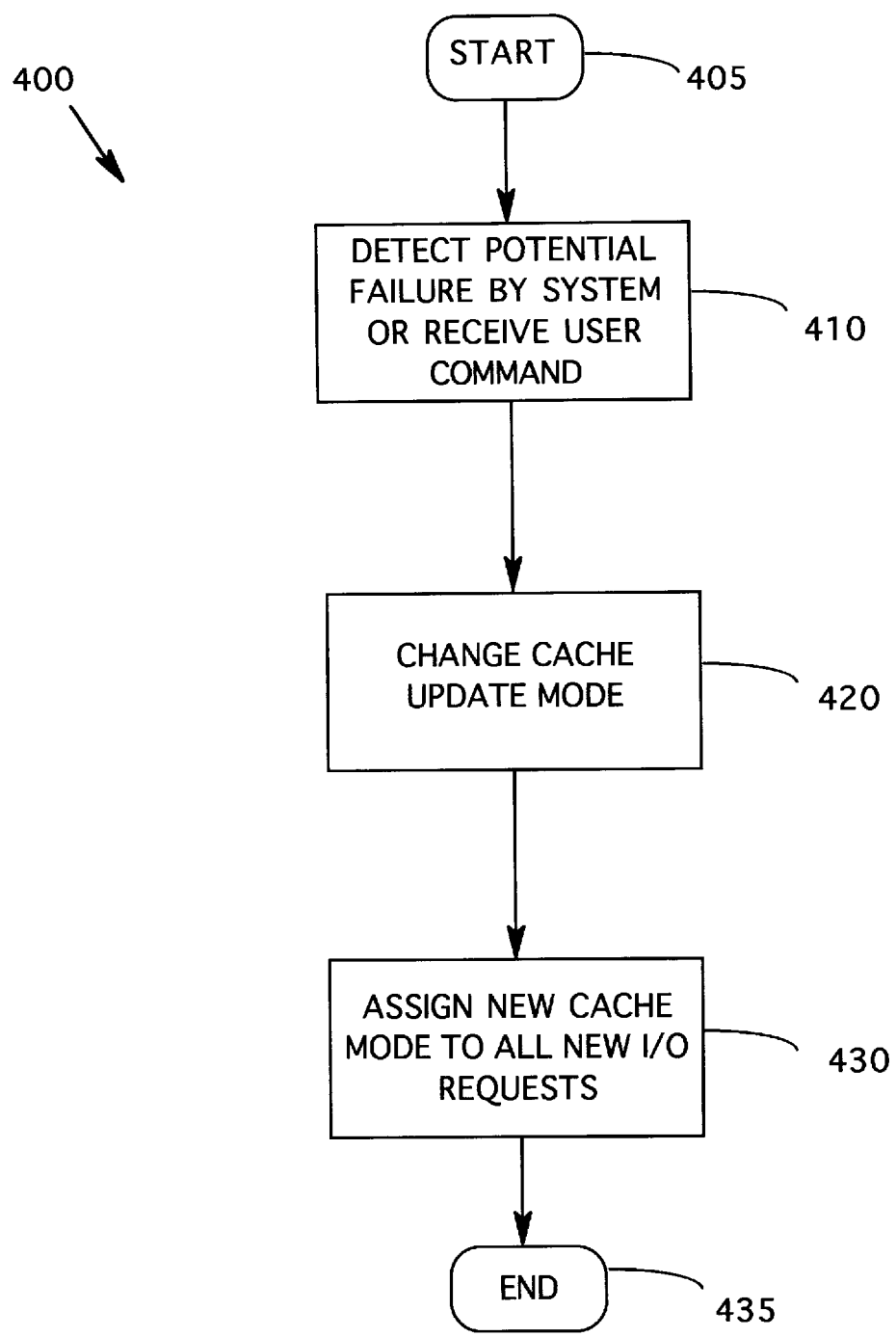
FIG. 4 illustrates a flowchart representing the operation of the present invention.

FIG. 4 illustrates a flowchart representing the operation of the present invention. The method 400 begins at step 405 and proceeds to step 410 where the method detects a potential failure or receives a user command for changing the cache mode of the volume. Using failure detection as a trigger for cache mode transition is an important aspect of the present invention. In a storage array system, redundancy is generally designed into the system to safeguard against failure and to ensure data integrity. The redundancy includes multiple power supplies and redundant disks. When the method detects a drive failure in a volume or a power supply failure in a disk array subsystem, the cache mode of the affected volumes will be automatically changed to write-through from delayed-write in step 420, thereby minimizing potential data loss. Additional triggering failures may include controller failure, fan failure or rise in temperature within the system.

Furthermore, the method in step 410 may change the cache mode of a volume in response to a user command. In performing critical operations, a user may elect the more reliable write-through mode for a volume at the expense of performance. Thus, the method provides a user with the flexibility to match the level of performance and reliability for a given task by changing the cache mode in step 420.

In step 430, the method assigns all subsequent I/O requests to the relevant volumes with the new cache mode, while maintaining previous I/O requests with the former cache mode. All I/O requests are completed using their respective cache modes of operation and the method ends in step 435. Thus, the current method enables a storage array system to change the cache mode of operation to reduce the exposure of data to the failure of system components.

There has thus been shown and described a novel method that alters the cache mode of a volume dynamically without creating inconsistency of the user data or halting I/O operations. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. In a storage system containing a plurality of storage elements, apparatus comprising:
   a command manager for producing an I/O request in response to an I/O command generated by a host computer that is coupled to the command manager;
   wherein said I/O request contains a cache mode field for receiving one of a plurality of operational modes from said command manager.

2. The apparatus of claim 1, wherein said plurality of operational modes include, no cache, write-through and delayed-write.

3. The apparatus of claim 1, wherein said operational mode is selected in response to a user command.

4. The apparatus of claim 1, wherein said operational mode is selected in response to detection of a hardware failure in the storage system.

5. In a storage system containing a plurality of storage elements grouped within at least one volume, a method of changing a cache mode comprising the steps of:
- (a) changing the cache mode of the volume from a first mode to a second mode in response to a cache mode change command;
- (b) assigning a new I/O request directed at the volume with said second mode; and
- (c) maintaining the cache mode assignment of any prior I/O requests.

6. The method of claim 5, wherein said assigning step initializes a cache mode field of said new I/O request with a value corresponding to said second mode, wherein said first mode is a delayed-write mode and said second mode is a write-through mode.

7. The method of claim 5, wherein said assigning step initializes a cache mode field of said new I/O request with a value corresponding to said second mode, wherein said first mode is a write-through mode and said second mode is a delayed-write mode.

8. The method of claim 5, wherein said cache mode change command is generated in response to occurrence of one or more hardware failures, wherein said failures comprise a power supply failure, a disk failure, a controller failure, a fan failure or a rise in temperature within the storage system.

9. The method of claim 8, wherein said assigning step initializes a cache mode field of said new I/O request with a value corresponding to said second mode, wherein said first mode is a delayed-write mode and said second mode is a write-through mode.

10. The method of claim 8, wherein said assigning step initializes a cache mode field of said new I/O request with a value corresponding to said second mode, wherein said first mode is a write-through mode and said second mode is a delayed-write mode.

11. The method of claim 5, wherein said cache mode change command is generated in response to a user command.

12. The method of claim 11, wherein said assigning step initializes a cache mode field of said new I/O request with a value corresponding to said second mode, wherein said first mode is a delayed-write mode and said second mode is a write-through mode.

13. The method of claim 12, wherein said assigning step initializes a cache mode field of said new I/O request with a value corresponding to said second mode, wherein said first mode is a write-through mode and said second mode is a delayed-write mode.

* * * * *